(No Model.) 2 Sheets—Sheet 1.
H. P. BROWN.
INSULATOR FOR ELECTRIC RAILWAY WIRES.
No. 428,071. Patented May 20, 1890.
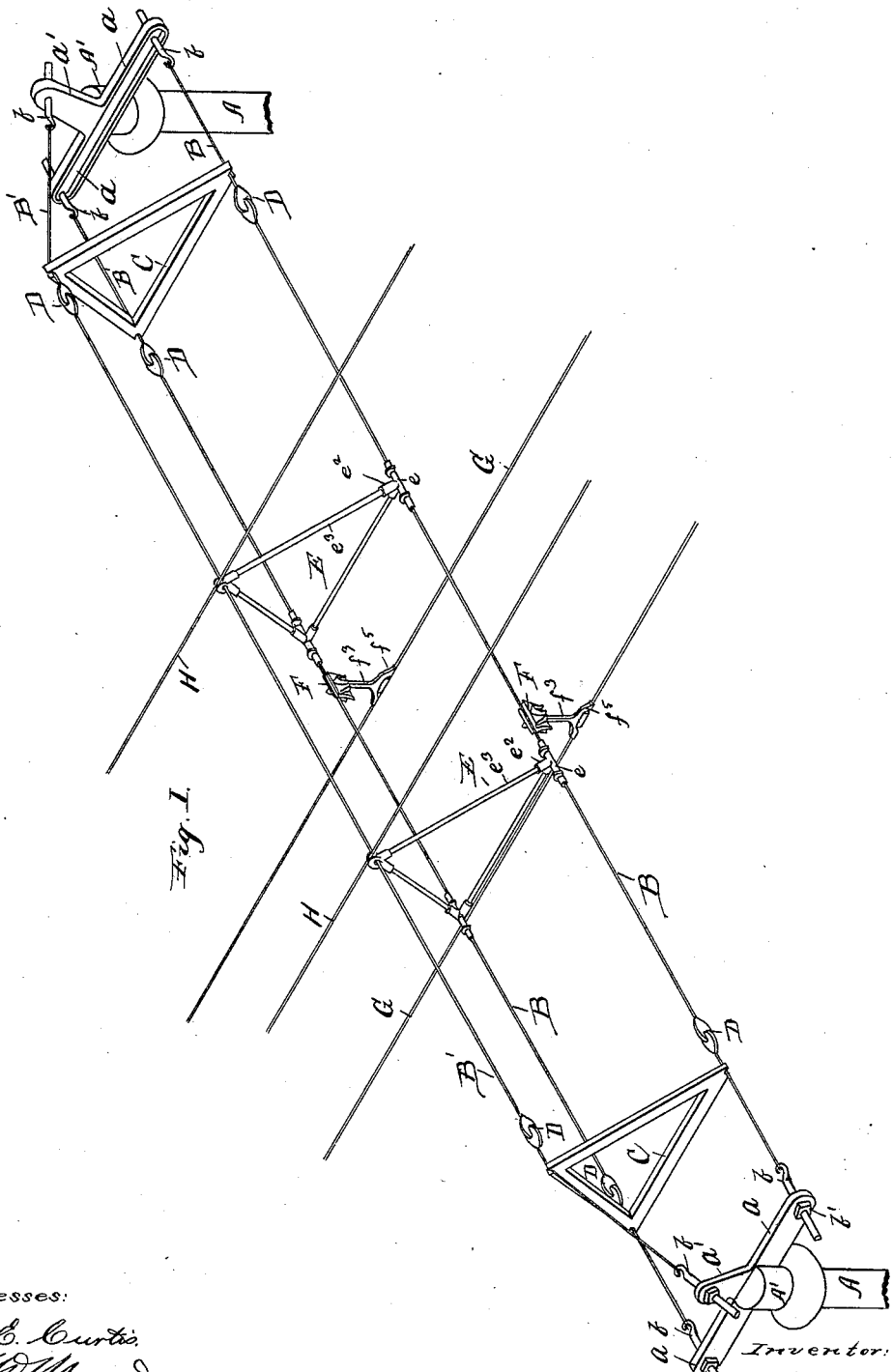
Witnesses:
Geo. E. Curtis.
A. M. Munday
Inventor:
Harold P. Brown
By Munday, Evarts & Adcock
His Attorneys (No Model.) 2 Sheets—Sheet 2.
H. P. BROWN.
INSULATOR FOR ELECTRIC RAILWAY WIRES.
No. 428,071. Patented May 20, 1890.
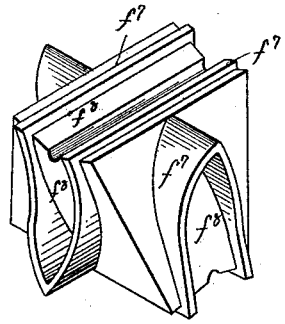
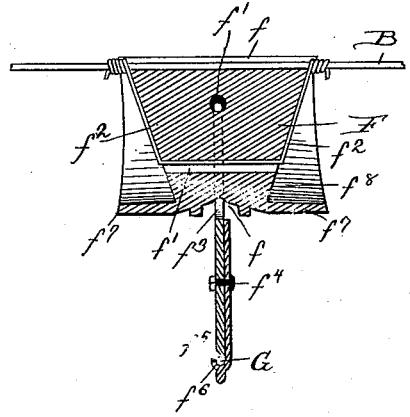
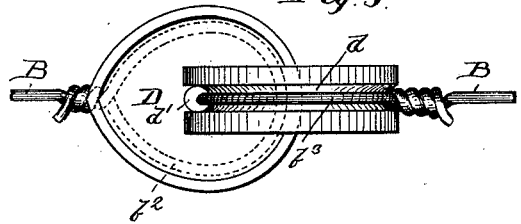
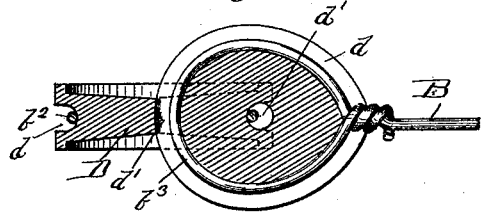
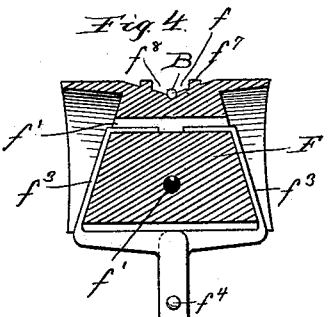
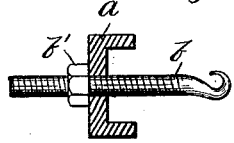
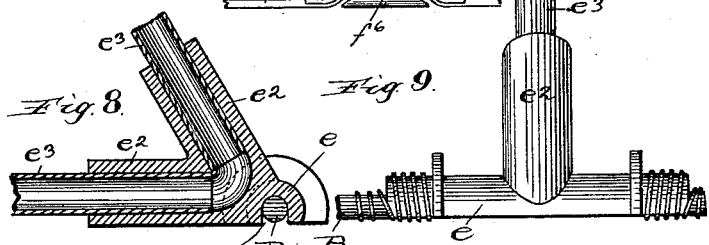
Witnesses:
Lew. E. Curtis.
H. W. Munday
Inventor:
Harold P. Brown
By Munday, Evarts & Adcock
His Attorneys.
THE NORRIS PETERS CO., PHOTO-LITHO., WASHINGTON, D. C.

UNITED STATES PATENT OFFICE.

HAROLD P. BROWN, OF NEW YORK, N. Y.

INSULATOR FOR ELECTRIC-RAILWAY WIRES.

SPECIFICATION forming part of Letters Patent No. 428,071, dated May 20, 1890.

Application filed March 10, 1890. Serial No. 343,232. (No model.)

*To all whom it may concern:*

Be it known that I, HAROLD P. BROWN, a citizen of the United States, residing at New York, in the county of New York and State of New York, have invented a new and useful Improvement in Insulators for Electric Street-Railway Wires, of which the following is a specification.

My invention relates to improvements in means for supporting and insulating the overhead electric wires used for electric railways.

Heretofore it has not been considered practicable to employ glass insulating-supports to support the overhead wires of trolley electric railways, (though glass is recognized as one of the best and most durable insulating materials known,) owing to the great weight of the electric wires and the strains to which the insulating-support is necessarily subjected.

It is the object of my invention to produce a glass insulating-support of a strong, efficient, and durable construction for such electric wires, and which will not only be amply strong to sustain the strain to which it may be subjected, but shall also operate to so shed the water as to prevent the possibility of the water forming an electrical connection between the line-wires and the supporting-wires.

To this end my invention consists, in connection with other parts, as hereinafter specified in the claims, of an insulating-support of glass or other suitable material placed between the two wires attached thereto, so that the strain upon the glass support is a crushing strain as contradistinguished from a pulling strain. By thus combining the glass support with the two wires attached thereto, so that the crushing strength of the material is utilized instead of its tensile strength or cohesion, I am enabled to use glass insulators for supporting the electric line-wires.

My invention also consists in the novel devices and novel combinations of parts and devices herein shown and described, and more particularly pointed out in the claims.

In the accompanying drawings, which form a part of this specification, and in which similar letters of reference indicate like parts, Figure 1 is a perspective view of a device embodying my invention. Fig. 2 is a detail perspective view of one of the glass insulating-supports employed for supporting the electric wire from the cross supporting or span wire. Fig. 3 is a vertical section taken on line 3 3 of Fig. 2. Fig. 4 is a vertical section taken on line 4 4 of Fig. 3. Figs. 5 and 6 are plan and side views, respectively, of the glass insulating-supporter employed to insulate the cross supporting or span wires. Fig. 7 is a detail view of the hook for adjustably attaching the cross supporting or span wire to the post, and Figs. 8 and 9 are detail views of the inside spreader or brace for the three supporting-wires.

In said drawings, A A represent the posts, which are planted on each side of the street. Each of these posts is or may be furnished with a metallic cap A', having two horizontal arms $a$ $a$ and a short vertical arm $a'$, to which the three cross supporting or span wires B B B' are attached by the screw-threaded hooks $b$ and nuts $b'$, so that all these cross-supporting-wires may be properly strained. The three wires B B B' are separated and braced by triangular spreaders C C, having notches $c$ at their corners, in which the wires B B B' are seated. The triangular spreaders C C are located near the posts A A. The vertical height of the spreaders C C is such in relation to the upwardly-projecting arms $a'$ and the points of attachment of the upper wire B' to the posts as to give a trussing or bracing strain to the system of three wires.

The three cross supporting-wires B B B' are each furnished with an insulating link or support of glass D, around which the two cross-loops $b^2$ $b^3$ of the wires B B or B' B' pass, so that the glass insulator will be embraced between the two opposing loops $b^2$ $b^3$, and be thus subjected to a crushing rather than a pulling strain.

The insulating-block D is furnished with guide-grooves $d$ and perforations $d'$ to receive the two opposing loops $b^2$ and $b^3$ of the wires, as is clearly shown in Figs. 5 and 6.

It will be observed that the insulating-connection between the two ends of the wires B B, or between the two cross-loops $b^2 b^3$, formed at the meeting ends of the wires B B, in fact consists of a mass of glass embraced in and between the two loops or links $b^2 b^3$, and that this mass of glass is subjected simply to a crushing strain, which the material is well adapted to withstand, although a considerable weight is necessarily supported from the wires B B B'.

E E are triangular spreaders located between the insulating-supports D D of each of the wires B B B', for the purpose of bracing and stiffening the triangular structure formed by the wires B B B'. These braces or spreaders E E are formed of insulating material in whole or in part, and consist, preferably, of socket-pieces $e$, having holes or grooves $e'$ to receive the three wires B B B' and socket-arms $e^2$ to receive the connecting brace-arms $e^3$, of insulating material.

F F are the blocks of insulating material which support and insulate the electric wires G G from the cross or span wires B B. Each of these blocks F F is furnished with a groove $f$ and a hole or eye $f'$ for receiving the attaching wires or bails $f^2 f^3$, by which the block F is attached to the supporting-wire B and to the electric wire G, and by and between which attaching wires or bails the mass of the glass block F is embraced, so that the glass material will be subjected to a crushing rather than a pulling strain. It will be observed that the insulating-block F is substantially of the same construction as the block D, before described, and involves the same principle in that both insulating-blocks D, and F are embraced by and between the two wires attached thereto and which are to be insulated thereby.

The difference between the blocks F and D is due to the fact that the block D is designed to be inserted as a link between two wires or between two parts of one wire extending in the same direction, while the insulating-block F is designed for supporting and insulating wires extending at an angle to each other, as the wires B G. On account of this difference between the blocks D F and the different use to which in my complete system they are put I have chosen to designate them by different letters of reference in the drawings.

The attaching wire or bail $f^2$ may preferably consist simply of a short piece of wire having its opposite ends coiled around or otherwise secured to the cross supporting or span wire B. The attaching wire or bail $f^3$ is preferably made in two parts or clamps secured together by a threaded screw or bolt $f^4$, so that it may be readily detached from the insulating-block. The attaching device or bail $f^3$ is further provided with a grooved foot $f^5$, having a lip $f^6$ to receive and retain the electric wire G in place.

The block F is furnished with a series of ridges or projections $f^7$ and intervening grooves or channels $f^8$ for the purpose of shedding the rain or water from the block and preventing the water from forming an electric connection between the wires which are connected together and insulated from each other by the block. The form of these water-shedding ridges and channels may be widely varied without departing from the principle of the improvement; but the shape which I prefer to use is that indicated in the drawings at Figs. 2, 3, and 4.

H H represent the longitudinal guard-wires above the electric wires G G, for the purpose of protecting the trolley-wires G G from other wires which may by accident fall thereon.

I claim—

1. The combination of posts A, having horizontal and vertical arms $a a$ and $a'$, of the cross supporting-wires B B B', attached to said arms, and spreaders C C, embraced between said wires B B B', substantially as specified.

2. The combination of posts A, having horizontal and vertical arms $a a$ and $a'$, of the cross supporting-wires B B B', attached to said arms, spreaders C C, embraced between said wires B B B', insulating-blocks D D, and insulating-spreaders E E, substantially as specified.

3. The combination of the posts A A and cross supporting-wire B, furnished with insulating supporting-blocks D D, provided with grooves $d$ and perforations $d'$ to receive the cross-loops $b^2 b^3$ at the meeting ends of the wire B, so that said insulating-block will be subjected to a crushing instead of a pulling strain, substantially as specified.

4. The combination of the posts A A, cross supporting-wire B, furnished with insulating supporting-blocks D D, provided with grooves $d$ and perforations $d'$ to receive the cross-loops $b^2 b^3$ at the meeting ends of the wire B, so that said insulating-block will be subjected to a crushing instead of a pulling strain, electric wire G, and insulating-block F, for connecting and insulating said wires B G, said block F being provided with grooves $f$ and perforations $f'$ to receive the attaching wires or bails $f^2 f^3$ on opposite sides of its center, so that said insulating-block will be subjected to a crushing instead of a pulling strain, substantially as specified.

5. The insulating-block F, having grooves and perforations to receive the wires to be connected and insulated and alternate ridges and channels for shedding the water and preventing the water from forming an electric connection between the wires, substantially as specified.

6. The combination of the cross supporting-wire B with electric wire G and insulating-block F, having grooves $f$ and perforations $f'$ crossing each other on opposite sides of its center, and the attaching wires or bails $f^2 f^3$, by and between which said block F is embraced, substantially as specified.

7. The insulating-block F, furnished with alternate water-shedding ridges and channels, substantially as shown and described.

8. The combination of the block F, having grooves $f$ and perforations $f'$, with attaching-wire $f^2$ and the attaching-bail $f^3$, made in two clamping parts secured together and provided with a foot to receive the electric or trolley wire, substantially as specified.

HAROLD P. BROWN.

Witnesses:
H. M. MUNDAY,
EMMA HACK.